United States Patent
Shiraishi et al.

(10) Patent No.: US 9,811,373 B2
(45) Date of Patent: Nov. 7, 2017

(54) ANALYSIS ENGINE CONTROL DEVICE

(75) Inventors: Nobuhisa Shiraishi, Tokyo (JP);
Shinichiro Kamei, Tokyo (JP); Takeshi Arikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 788 days.

(21) Appl. No.: 13/983,925

(22) PCT Filed: Jan. 18, 2012

(86) PCT No.: PCT/JP2012/000254
§ 371 (c)(1),
(2), (4) Date: Oct. 4, 2013

(87) PCT Pub. No.: WO2012/108125
PCT Pub. Date: Aug. 16, 2012

(65) Prior Publication Data
US 2014/0026136 A1 Jan. 23, 2014

(30) Foreign Application Priority Data
Feb. 9, 2011 (JP) ................. 2011-025805

(51) Int. Cl.
*G06F 9/46* (2006.01)
*G06Q 10/06* (2012.01)

(52) U.S. Cl.
CPC ............... *G06F 9/46* (2013.01); *G06Q 10/06* (2013.01)

(58) Field of Classification Search
None
See application file for complete search history.

(56) References Cited

U.S. PATENT DOCUMENTS 5,313,462 A * 5/1994 Fujino ................ H04J 3/0605 358/409
7,296,238 B1 * 11/2007 Zurawski ........... G06Q 30/0603 709/246

(Continued)

FOREIGN PATENT DOCUMENTS

JP 2002-099430 A 4/2002
JP 2006-048429 A 2/2006

(Continued)

OTHER PUBLICATIONS

Machine Translation of IDS: JP2008-104007.*
International Search Report for PCT/JP2012/000254, dated Apr. 17, 2012.

*Primary Examiner* — Michelle Hausmann
(74) *Attorney, Agent, or Firm* — Sughrue Mion, PLLC

(57) ABSTRACT

An analysis engine control device 100 of the present invention includes: an analysis engine meta-information table 110 storing an analysis process content and an analysis process result characteristic for each analysis engine 200; a process flow generating means 101 for, in response to an analysis process request, selecting a plurality of analysis engines 200 each executing an analysis process satisfying the analysis process result condition and corresponding to the analysis process content, and generating a process flow; and an analysis process executing means 102 for executing an analysis process based on the generated process flow. The process flow generating means 101 is configured to, in accordance with a result of an actually executed analysis process, correct the process flow so that an analysis process satisfying the analysis process result condition and corresponding to the analysis process content is executed, based on the analysis engine meta-information table.

13 Claims, 11 Drawing Sheets

(56) References Cited

U.S. PATENT DOCUMENTS

| | | | | |
|---|---|---|---|---|
| 7,865,873 | B1* | 1/2011 | Zoellner | G06F 17/30551 715/760 |
| 8,677,367 | B2* | 3/2014 | Tsudaka | G06F 9/4881 718/103 |
| 9,131,241 | B2* | 9/2015 | Ji | H04N 19/61 |
| 2002/0172431 | A1* | 11/2002 | Atkins | G06T 5/20 382/260 |
| 2003/0206583 | A1* | 11/2003 | Srinivasan | H04N 19/70 375/240.01 |
| 2003/0210250 | A1* | 11/2003 | Kim | G09G 3/2003 345/589 |
| 2006/0195210 | A1* | 8/2006 | Padisetty | G06Q 10/06 700/100 |
| 2006/0274967 | A1* | 12/2006 | Nagao | G06T 1/60 382/276 |
| 2007/0116379 | A1* | 5/2007 | Corcoran | G06K 9/0061 382/275 |
| 2007/0226635 | A1* | 9/2007 | Goebel | G06F 17/30905 715/745 |
| 2008/0059462 | A1* | 3/2008 | Millett | G06F 17/30333 |
| 2008/0062329 | A1* | 3/2008 | Hio | G06F 3/1423 348/705 |
| 2009/0157334 | A1* | 6/2009 | Goodnow | H03K 19/0008 702/61 |
| 2009/0245587 | A1* | 10/2009 | Holcomb | H04N 19/176 382/108 |
| 2010/0057953 | A1* | 3/2010 | Kim | G06F 13/409 710/52 |
| 2010/0066822 | A1* | 3/2010 | Steinberg | G06K 9/00208 348/77 |
| 2010/0290700 | A1* | 11/2010 | Yokono | G06K 9/00369 382/159 |
| 2011/0188744 | A1* | 8/2011 | Sun | G06T 5/50 382/162 |
| 2012/0030218 | A1* | 2/2012 | Jiang | G06F 17/30985 707/754 |
| 2012/0106852 | A1* | 5/2012 | Khawand | H04N 19/619 382/218 |
| 2012/0159290 | A1* | 6/2012 | Pulsipher | G06K 9/00369 714/819 |

FOREIGN PATENT DOCUMENTS

| | | |
|---|---|---|
| JP | 2007-102651 A | 4/2007 |
| JP | 2008-140007 A | 6/2008 |

* cited by examiner

Fig.2

| META-INFORMATION ID | ENGINE ID | ENGINE TYPE | ANALYSIS ACCURACY | REQUIRED TIME | PARAMETER SET |
|---|---|---|---|---|---|
| META-INFORMATION 1 | ANALYSIS ENGINE A | THREE-DIMENSIONAL LOCATION DETECTION | DETECTION ERROR 2m | 1 SECOND | DISTORTION CORRECTION=OFF, PARAMETER1, PARAMETER2 |
| META-INFORMATION 2 | ANALYSIS ENGINE A | THREE-DIMENSIONAL LOCATION DETECTION | DETECTION ERROR 50cm | 5 SECONDS | DISTORTION CORRECTION=ON, PARAMETER1, PARAMETER2 |
| META-INFORMATION 3 | ANALYSIS ENGINE B | OBJECT ID DETECTION | DETECTION ERROR 1m | 1 SECOND | PARAMETER11, PARAMETER22 |
| META-INFORMATION 4 | ANALYSIS ENGINE C | OBJECT ID DETECTION | DETECTION ERROR 3m | 0.5 SECONDS | PARAMETER111, PARAMETER222 |
| META-INFORMATION 5 | ANALYSIS ENGINE D | TWO-DIMENSIONAL LOCATION DETECTION | DETECTION ERROR 1m | 3 SECONDS | — |
| META-INFORMATION 6 | ANALYSIS ENGINE E | FACIAL IMAGE RECOGNITION | RECOGNITION RATE OF 95% OR HIGHER | 1 SECOND | — |
| META-INFORMATION 7 | ANALYSIS ENGINE F | OBJECT ID DETECTION | ERROR OF LESS THAN 10% | 0.5 SECONDS | — |

Fig.3

| ANALYSIS PROCESS CONTENT | ANALYSIS ENGINE COMBINATION |
|---|---|
| UNIDENTIFIED-OBJECT LOCATION SPECIFICATION | THREE-DIMENSIONAL LOCATION DETECTION ENGINE + OBJECT ID SPECIFICATION ENGINE |
| FACE RECOGNITION PROCESS | FACIAL IMAGE RECOGNITION ENGINE + FACE MATCHING ENGINE |
| ... | ... |

ANALYSIS ENGINE CONTROL DEVICE

CROSS REFERENCE TO RELATED APPLICATIONS

This application is a National Stage of International Application No. PCT/JP2012/000254 filed Jan. 18, 2012, claiming priority based on Japanese Patent Application No. 2011-025805 filed Feb. 9, 2011, the contents of all of which are incorporated herein by reference in their entirety.

TECHNICAL FIELD

The present invention relates to an analysis engine control device, more specifically, relates to an analysis engine control device which generates a process flow of an analysis engine.

BACKGROUND ART

In accordance with development of information processing techniques, analysis engines analyzing various data have been developed. For example, there exist various analysis engines such as an analysis engine which generates location information tracing the flow of a person from moving image data, an analysis engine which specifies a person from still image data, and an analysis engine which generates text data from speech data. As one example, Patent Document 1 discloses an analysis system which performs genetic analysis. In order that the analysis system performs an appropriate analysis process, a technique of making a significant combination of variables used in the analysis process is disclosed.

On the other hand, in recent years, a system which makes a plurality of analysis engines work in cooperation and obtains a requested analysis result from a plurality of analysis target information has been developed. For example, a system which detects/specifies the location of any object or an object with a designated ID from a plurality of media information such as a video image, ultrasonic waves and radio waves has been developed.

Patent Document 1: Japanese Unexamined Patent Application Publication No. 2006-048429

However, in the case of analyzing by making a plurality of analysis engines work in cooperation, it is difficult to grasp an influence of the other analysis engine, and there arises a problem such that it is difficult to obtain an analysis process result satisfying analysis process requirements such as analysis process accuracy and an analysis process time finally required. For example, in a case that there exist a plurality of substitutable analysis engines, it is difficult to select an optimum analysis engine while considering an influence of or on the other analysis engine working in cooperation, and there arises a problem such that an analysis process with higher accuracy than needed is executed or an analysis process with insufficient accuracy is executed and, consequently, it is impossible to obtain a desired analysis process result. Further, it is also difficult to design a whole procedure by the respective analysis engines so as to satisfy a totally required processing time while considering a processing time required by the other analysis engine working in cooperation. Furthermore, because the respective analysis engines uniquely set analysis parameters, there arises a problem such that it is difficult to set appropriate analysis parameters for the respective analysis engines in the case of making the analysis engines work in cooperation.

SUMMARY

Accordingly, an object of the present invention is to solve the abovementioned problem such that it is difficult to obtain an analysis process result satisfying an analysis process requirement in the case of analyzing by making a plurality of analysis engines work in cooperation.

In order to achieve the object, an analysis engine control device of an exemplary embodiment of the present invention includes:

an analysis engine meta-information table storing an analysis process content and an analysis process result characteristic for each analysis engine;

a process flow generating means for, in response to an analysis process request in which an analysis process content and an analysis process result condition are set, selecting a plurality of analysis engines each executing an analysis process which satisfies the analysis process result condition set in the analysis process request and corresponds to the analysis process content based on the analysis engine meta-information table, and generating a process flow showing an analysis procedure by the selected analysis engines; and an analysis process executing means for executing an analysis process by each of the analysis engines based on the generated process flow, wherein the process flow generating means is configured to, in accordance with a result of an actual analysis process by each of the analysis engines executed by the analysis process executing means, correct the process flow so that an analysis process satisfying the analysis process result condition and corresponding to the analysis process content is executed, based on the analysis engine meta-information table.

Further, a program of another exemplary embodiment of the present invention is a computer program including instructions for causing an information processing device, which includes an analysis engine meta-information table storing an analysis process content and an analysis process result characteristic for each analysis engine, to realize;

a process flow generating means for, in response to an analysis process request in which an analysis process content and an analysis process result condition are set, selecting a plurality of analysis engines each executing an analysis process which satisfies the analysis process result condition set in the analysis process request and corresponds to the analysis process content based on the analysis engine meta-information table, and generating a process flow showing an analysis procedure by the selected analysis engines; and an analysis process executing means for executing an analysis process by each of the analysis engines based on the generated process flow, the computer program including instructions for causing the process flow generating means to perform operations which include, in accordance with a result of an actual analysis process by each of the analysis engines executed by the analysis process executing means, correcting the process flow so that an analysis process satisfying the analysis process result condition and corresponding to the analysis process content is executed, based on the analysis engine meta-information table.

Further, an analysis engine control method of another exemplary embodiment of the present invention includes, by an information processing device including an analysis engine meta-information table storing an analysis process content and an analysis process result characteristic for each analysis engine:

in response to an analysis process request in which an analysis process content and an analysis process result condition are set, selecting a plurality of analysis engines each executing an analysis process which satisfies the analysis process result condition set in the analysis process request and corresponds to the analysis process content based on the analysis engine meta-information table, and generating a process flow showing an analysis procedure by the selected analysis engines;

executing an analysis process by each of the analysis engines based on the generated process flow;

in accordance with a result of an actual analysis process by each of the analysis engines executed, correcting the process flow so that an analysis process satisfying the analysis process result condition and corresponding to the analysis process content is executed, based on the analysis engine meta-information table; and executing the analysis process by the analysis engine based on the corrected process flow.

With the configurations as described above, the present invention can provide an analysis engine control device which can easily obtain an analysis process result satisfying a desired analysis process requirement in the case of analyzing by making a plurality of analysis engines work in cooperation.

BRIEF DESCRIPTION OF DRAWINGS

FIG. 2 is a diagram showing an example of data stored in an analysis engine meta-information table disclosed in FIG. 1;

FIG. 3 is a diagram showing an example of data stored in an analysis engine combination information table disclosed in FIG. 1;

EXEMPLARY EMBODIMENTS

First Exemplary Embodiment

Figure 1:
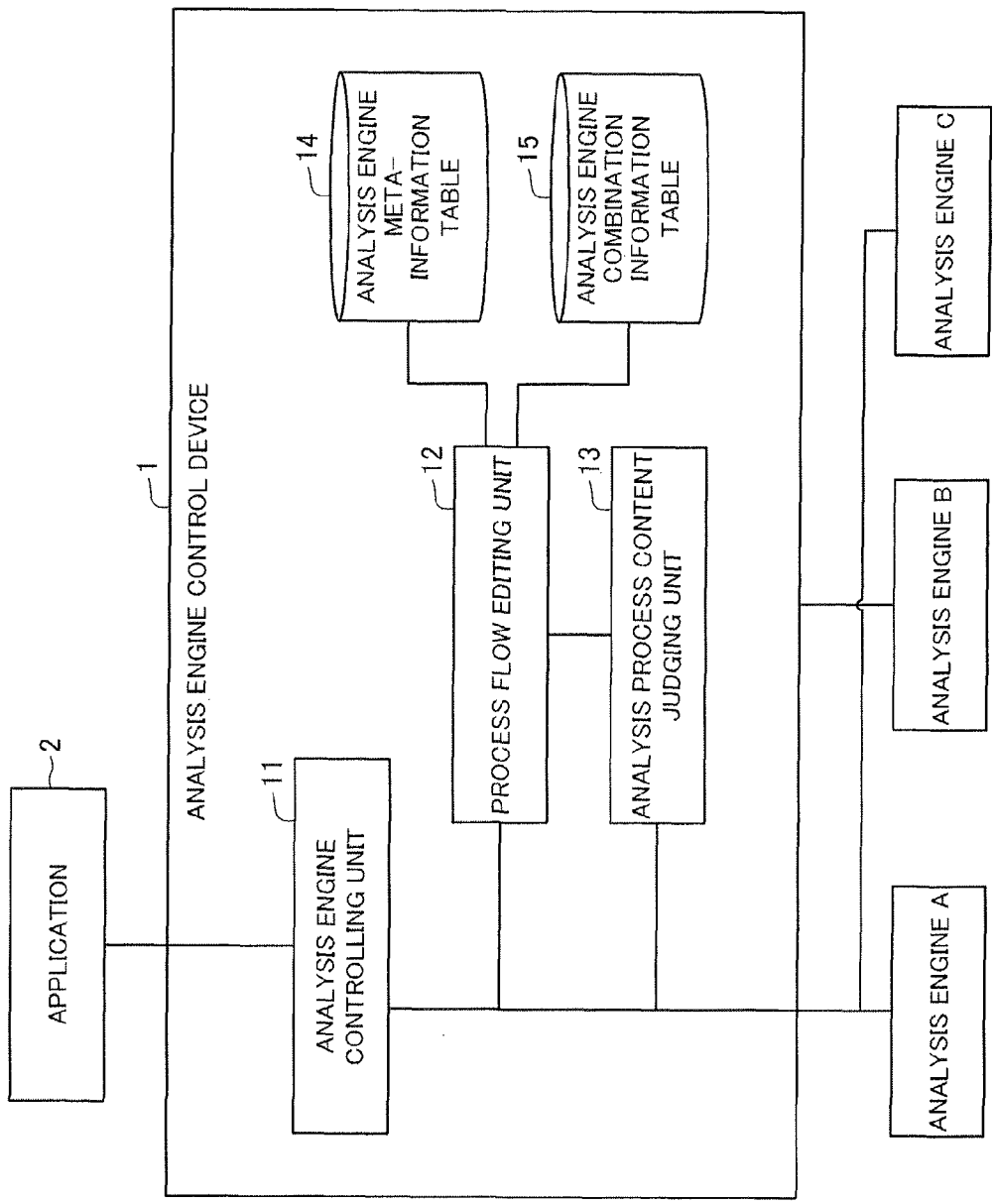
FIG. 1 is a block diagram showing the configuration of an analysis engine control device in a first exemplary embodiment.

A first exemplary embodiment of the present invention will be described with reference to FIGS. 1 to 10. FIG. 1 to 3 are diagrams for describing the configuration of an analysis engine control device. FIGS. 4 to 10 are diagrams for describing the operation of the analysis engine control device.

[Configuration]

An analysis engine control device 1 according to this exemplary embodiment is an information processing device including an arithmetic device and a storage device, and is configured by one or a plurality of information processing devices. As shown in FIG. 1, the analysis engine control device 1 is connected with an application 2 installed in a client device and a plurality of analysis engines A, B and C, and has a function of, in response to an analysis process request from the application 2, controlling the operations of the plurality of analysis engines A, B and C to execute an analysis process and returning an analysis process result to the application 2. The number of the analysis engines A, B and C connected with the analysis engine control device 1 is not limited to three.

As shown in FIG. 1, the analysis engine control device 1 includes an analysis engine controlling unit 11, a process flow editing unit 12 and an analysis process content judging unit 13 that are built by installation of programs into the arithmetic device. Moreover, the analysis engine control device 1 has an analysis engine meta-information table 14 and an analysis engine combination information table 15 in the storage device.

The analysis engine controlling unit 11 (an analysis process executing means) accepts an analysis process request from the application 2, passes the analysis process request to the process flow editing unit 12, and asks generation of a process flow representing an analysis procedure satisfying the analysis process request. Then, the process flow editing unit 12 generates a process flow satisfying the analysis process request in cooperation with the analysis process content judging unit 13 as described later, and the analysis engine controlling unit 11 receives the generated process flow from the process flow editing unit 12. The analysis engine controlling unit 11 executes controls the operations of the respective analysis engines connected thereto to execute an analysis process based on the received process flow.

Further, the analysis engine controlling unit 11 receives the results of analysis processes by the respective analysis engines, passes these analysis process results to the process flow editing unit 12, and asks correction of the process flow as needed. In this case, every time receiving an analysis process result from each of the analysis engines, the analysis engine controlling unit 11 may pass the analysis process result to the process flow editing unit 12. That is to say, at the time of acquisition of the result of an analysis process by part of the analysis engines included in the process flow as an intermediate result of an analysis process in the whole process flow, the analysis engine controlling unit 11 may pass the analysis process result to the process flow editing unit 12. However, the analysis engine controlling unit 11 may receive all analysis process results based on the process flow from the respective analysis engines and thereafter pass the analysis process results to the process flow editing unit 12.

The analysis engine controlling unit 11 receives a process flow corrected by the process flow editing unit 12 as described later from the process flow editing unit 12, and controls the operations of the respective analysis engines connected thereto to execute an analysis process. Moreover, the analysis engine controlling unit 11 receives the results of analysis processes by the respective analysis engines, passes the analysis process results to the process flow editing unit 12 in the same manner as described above, and asks correction of the process flow as needed. Also in this case, even in the middle of an analysis process of the whole process flow, at the time of acquisition of the result of an analysis process by part of the analysis engines included in the process flow, the analysis engine controlling unit 11 may pass the analysis process result to the process flow editing unit 12. Alternatively, the analysis engine controlling unit 11 may receive the result of the analysis process in the process flow to the process flow editing unit 12. The process described above is repeatedly executed.

The process flow editing unit 12 (a process flow generating means) generates a process flow representing an analysis procedure satisfying an analysis process request received from the analysis engine controlling unit 11. In this case, "analysis process content" which represents the processing content of an analysis process and "analysis process result condition" which represents conditions, such as the accuracy of an analysis process and an analysis process time, of an analysis process result are set in an analysis process request from the application 2. For example, in a case that an analysis process request is information that "Detect an object location within two seconds with an error of 10 m or less," "detect an object location" is equivalent to "analysis process content," and "with an error of 10 m or less" and "within two seconds" are equivalent to "analysis process result condition."

It is described above that "detect an object location" in the analysis process request is equivalent to "analysis process content." A process of thus specifying "analysis process content" in the analysis process request is executed by the analysis process content judging unit 13. To be specific, the analysis process content judging unit 13 receives the analysis process request passed from the process flow editing unit 12 and, based on a specific keyword therein, specifies "analysis process content" previously set in the analysis engine combination information table 15.

In the analysis engine combination information table 15, as shown in FIG. 3, "analysis process content" representing the content of an analysis process previously set and "analysis engine combination" capable of executing the analysis process of the "analysis process content" are stored so as to correspond to each other. As "analysis engine combination," a combination of "engine types" representing the types of analysis engines classified in accordance with the contents of analysis processes of the analysis engines is set. The "engine types" are also stored as information representing the contents of analysis processes of analysis engines so as to correspond to the respective analysis engines within the analysis engine meta-information table 14 described later.

In the case of storing the analysis engine combination information table 15 of the content shown in FIG. 3, the analysis process content judging unit 13 judges that "unidentified-object location specification" in the analysis engine combination information table 15 is equivalent to "analysis process content" based on a keyword "object location" or "location" in the analysis process request, and specifies "unidentified-object location specification" as "analysis process content." Then, the analysis process content judging unit 13 returns the specified "analysis process content" to the process flow editing unit 12. Although one example is described above as a method for specifying the content of an analysis process, the specifying method is not limited to the abovementioned method. For example, a keyword itself in an analysis process request may be judged as "analysis process content." Alternatively, information of "analysis process content" and "analysis process result condition" designated in an analysis process request inputted from the application 2 may be specified as "analysis process content" and "analysis process result condition," respectively.

The process flow editing unit 12 selects a plurality of analysis engines each executing an analysis process corresponding to "analysis process content" so as to satisfy "analysis process result condition" in the analysis process request, based on the analysis engine meta-information table 14 and the analysis engine combination information table 15. To be specific, the process flow editing unit 12 firstly specifies "analysis engine combination" stored so as to correspond to "analysis process content" judged to be equivalent to "analysis process content" by the analysis process content judging unit 13 as described above, from the analysis engine combination information table 15. Then, the process flow editing unit 12 selects analysis engines of "engine type" included in the specified "analysis engine combination" from the analysis engine meta-information table 14. For example, when it is judged that "analysis process content" is "unidentified-object location specification" as described above, the process flow editing unit 12 selects analysis engines (meta-information 1 or 2, and meta-information 3 or 4) that "engine types" of "three-dimensional location detection engine" and "object ID specification engine" representing "analysis engine combination" stored in the analysis engine combination information table 15 so as to correspond to "unidentified-object location specification" are set, respectively, from the analysis engine meta-information table 14.

The analysis engine meta-information table 14 stores meta-information of each analysis engine and, specifically, stores "meta-information ID," "engine ID" specifying an analysis engine, "engine type" representing a classification previously set for each content of analysis by an analysis engine, "analysis accuracy" representing analysis process accuracy that is a characteristic of the result of an analysis process by an analysis engine, "required time" representing an analysis process time that is a characteristic of the result of an analysis process by an analysis engine, and "parameter set" representing parameters which are set in an analysis engine when the analysis engine executes an analysis process, as shown in FIG. 2. Among the meta-information of the analysis engines, analysis process result characteristics such as "analysis accuracy" and "required time" are values which are set based on the result of an analysis process executed in the past or values which are set based on simulation, and it is not guaranteed that the result of an analysis process always achieves such values. This is because, when data to be analyzed by an analysis engine is media information like a video image, analysis accuracy and an analysis process time vary depending on the definition of the data and an environment for acquisition of the data.

Further, the analysis engine meta-information table 14 stores meta-information for the respective parameter sets which are set for one analysis engine. For example, although "meta-information 1" and "meta-information 2" shown in FIG. 2 are meta-information of "analysis engine A," respectively, "parameter sets" to be set, namely, "patterns" of parameters are different from each other. Consequently, the respective meta-information store different "analysis accuracy" and "required time" depending on the patterns of parameters.

The process flow editing unit 12 selects, from the analysis engine meta-information table 14, analysis engines each of which is of "engine type" included in "analysis engine combination" stored so as to correspond to "analysis process content" and for each of which "analysis accuracy" and "required time" satisfying conditions such as analysis process accuracy and an analysis process time included in "analysis process result condition" included in the analysis request are set. For example, in the case of the abovementioned analysis process request, the process flow editing unit 12 selects analysis engines (meta-information 1 and meta-information 3) satisfying "analysis accuracy" of "with an error of 10 m or less" and "required time" of "within two seconds," and generates a process flow showing an analysis procedure for executing an analysis process by combining the selected analysis engines.

After generating the process flow as described above, the process flow editing unit 12 passes the generated flow to the analysis engine controlling unit 11. At this time, information about a plurality of executing analysis engines and parameters set for the respective analysis engines is set in the process flow. Then, based on the generated process flow, the analysis engine controlling unit 11 executes an analysis process by using the respective analysis engines as described above, and passes the result of the analysis process to the process flow editing unit 12.

Further, upon accepting an actual execution result of the generated process flow from the analysis engine controlling unit 11, the process flow editing unit 12 examines whether this analysis process result satisfies the analysis process request from the application 2, namely, conditions such as analysis process accuracy and an analysis process time that are "analysis process result conditions" included in the analysis process request. When the actual analysis process result based on the process flow does not satisfy "analysis process result conditions" included in the analysis process request, the process flow editing unit 12 corrects the process flow so that "analysis process result conditions" are satisfied.

In this case, the process flow editing unit 12 corrects the process flow by, for example, referring to the analysis engine meta-information table 14 and changing the analysis engine included in the process flow to an analysis engine with another meta-information ID of the same engine type as the analysis engine included in the process flow. For example, it is assumed that "analysis engine combination" corresponding to "analysis process contents" judged as described above is a combination of "engine types" of "three-dimensional detection engine" and "object ID specification engine" and an analysis engine corresponding to "object ID specification engine" is to be changed. In this case, the process flow editing unit 12 corrects the process flow by changing to another analysis engine of the same "engine type" as the analysis engine to be changed, or to an analysis engine of the same "engine type" for which a different parameter set is set at the time of an analysis process, based on the analysis engine meta-information table 14. At this time, the parameter set that is set for the analysis engine corrected on the analysis engine meta-information table 14 is also set in the process flow as well as the analysis engine.

When receiving the result of an analysis process by part of analysis engines included in a process flow as an intermediate result of an analysis process of the whole process flow from the analysis engine controlling unit 11, the process flow editing unit 12 examines whether the process flow satisfies an analysis process request based on the result of the analysis process by the part of the analysis engines. Alternatively, when receiving all analysis process results based on a process flow from the analysis engine controlling unit 11, the process flow editing unit 12 examines whether the process flow satisfies an analysis process request based on the analysis process results. Then, as described above, the process flow editing unit 12 corrects the process flow as needed.

[Operation]

Figure 4:
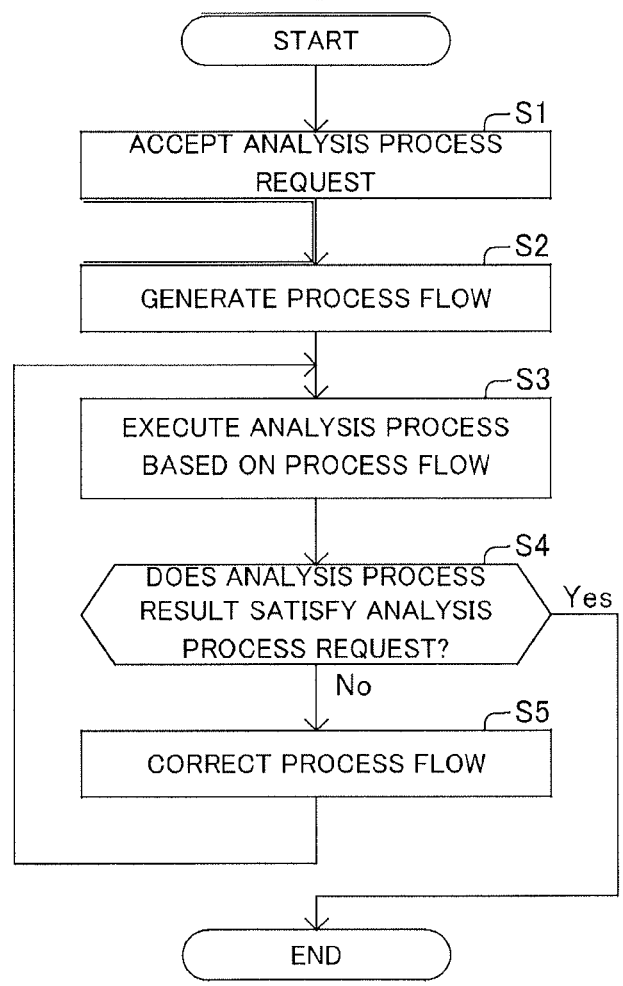
FIG. 4 is a flowchart showing the operation of the analysis engine control device disclosed in FIG. 1.
Figure 5:
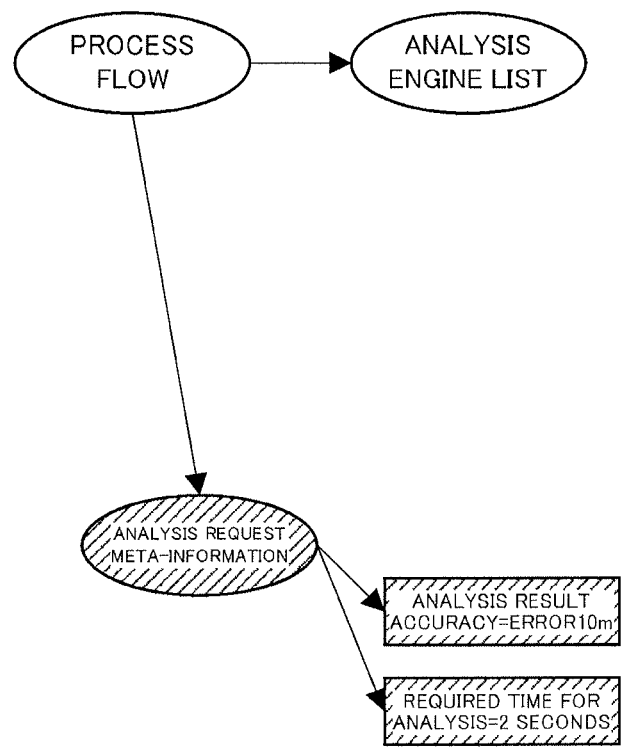
FIG. 5 is a diagram showing state transition of a process flow generated by the analysis engine control device disclosed in FIG. 1.
Figure 6:
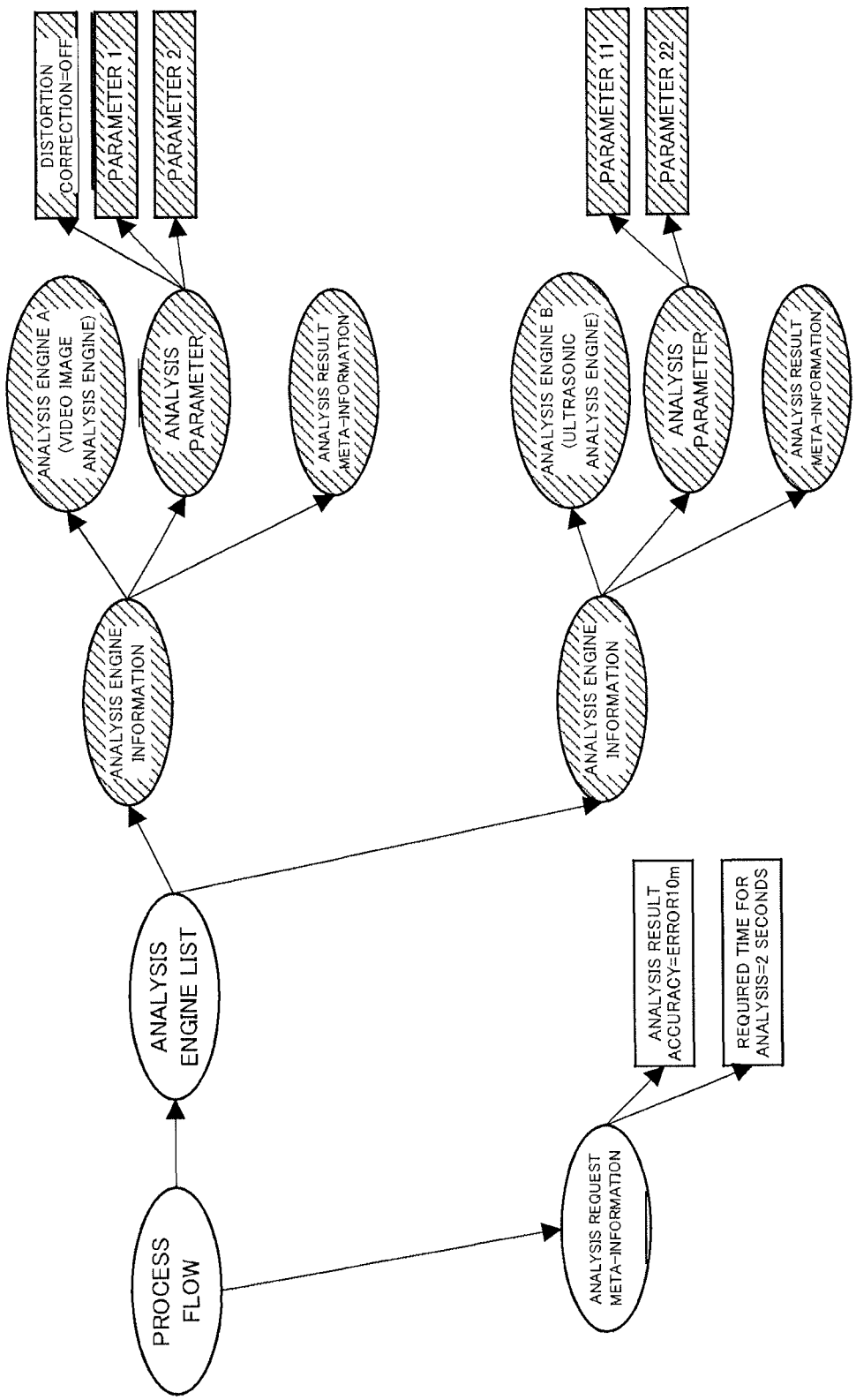
FIG. 6 is a diagram showing state transition of the process flow generated by the analysis engine control device disclosed in FIG. 1.

Next, the operation of the analysis engine control device 1 will be described with reference to a flowchart of FIG. 4 and diagrams showing state transition of a process flow of FIGS. 5 to 10.

First, when accepting an analysis process request from the application 2 (step S1), the analysis engine controlling unit 11 passes the analysis process request to the process flow editing unit 12, and asks generation of a process flow. Herein, it is assumed that the analysis process request from the application 2 is information of "Detect an object location within two seconds with an error of 10 m or less."

Then, the process flow editing unit 12 passes the received analysis process request to the analysis process content judging unit 13, and asks judgment of "analysis process content." Based on "analysis process content" of the received analysis process request, the analysis process content judging unit 13 specifies corresponding "analysis process content" in the analysis engine combination information table 15. In the case of the abovementioned analysis process request "Detect an object location within two seconds with an error of 10 m or less," the analysis process content judging unit 13 specifies "unidentified-object location specification" as "analysis process content." Then, the analysis process content judging unit 13 returns the specified "analysis process content" to the process flow editing unit 12.

Subsequently, the process flow editing unit 12 generates a process flow showing an analysis procedure, based on "analysis process content" of the analysis process request received from the analysis process content judging unit 13 and "analysis process result condition" of the analysis process request (step S2). In this case, the process flow editing unit 12 firstly specifies "analysis process result condition" of the analysis process request, and adds to analysis request meta-information in the process flow. In the case of the abovementioned analysis process request "Detect an object location within two seconds with an error of 10 m or less," the process flow editing unit 12 sets "analysis process result conditions" including "analysis process accuracy" of "with an error of 10 m or less" and "analysis process time" of "within two seconds" into the process flow as shown by shading in FIG. 5.

Subsequently, the process flow editing unit 12 selects an analysis engine which is equivalent to "analysis process content" received from the analysis process content judging unit 13 as described above and which satisfies "analysis process result conditions," from the analysis engine meta-information table 14 and the analysis engine combination information table 15. To be specific, the process flow editing unit 12 firstly specifies "analysis engine combination" stored so as to correspond to "analysis process content" from the analysis engine combination information table 15, and selects analysis engines of "engine types" included in the "analysis engine combination" from the analysis engine meta-information table 14. For example, when it is judged that "analysis process content" is "unidentified-object location specification" as described above, analysis engines (meta-information 1 or 2, and meta-information 3 or 4) for which "engine types" including "three-dimensional location detection engine" and "object ID specification engine" of "analysis engine combination" stored so as to correspond to "unidentified-object location information" are set become candidates selected from the analysis engine meta-information table 14.

Then, the process flow editing unit 12 selects an analysis engine combination which executes an analysis process satisfying "analysis process result conditions" in the analysis process request, from among the analysis engines as the selection candidates. For example, in the case of the above-mentioned analysis process request, because "analysis accuracy" is "with an error of 10 m or less" and "required time" is "within two seconds," the process flow editing unit 12 selects analysis engines such that characteristics ("analysis accuracy" and "required time") of an analysis process satisfying these conditions are stored in the analysis engine meta-information table 14. In this case, for example, the process flow editing unit 12 selects an analysis engine A (a video image analysis engine) having "meta-information 1" and an analysis engine B (an ultrasonic analysis engine" having "meta-information 3."

Then, the process flow editing unit 12 generates a process flow showing an analysis procedure that the selected analysis engines execute analysis processes, from the meta-information of the respective analysis engines. To be specific, in the process flow, the process flow editing unit 12 sets a combination of executing analysis engines and information of parameters set for the respective analysis engines. Thus, the process flow editing unit 12 generates a process flow to which information of analysis engines used for an analysis process is added as shown by shading in FIG. 6. The process flow editing unit 12 then passes the generated process flow to the analysis engine controlling unit 11.

Figure 7:
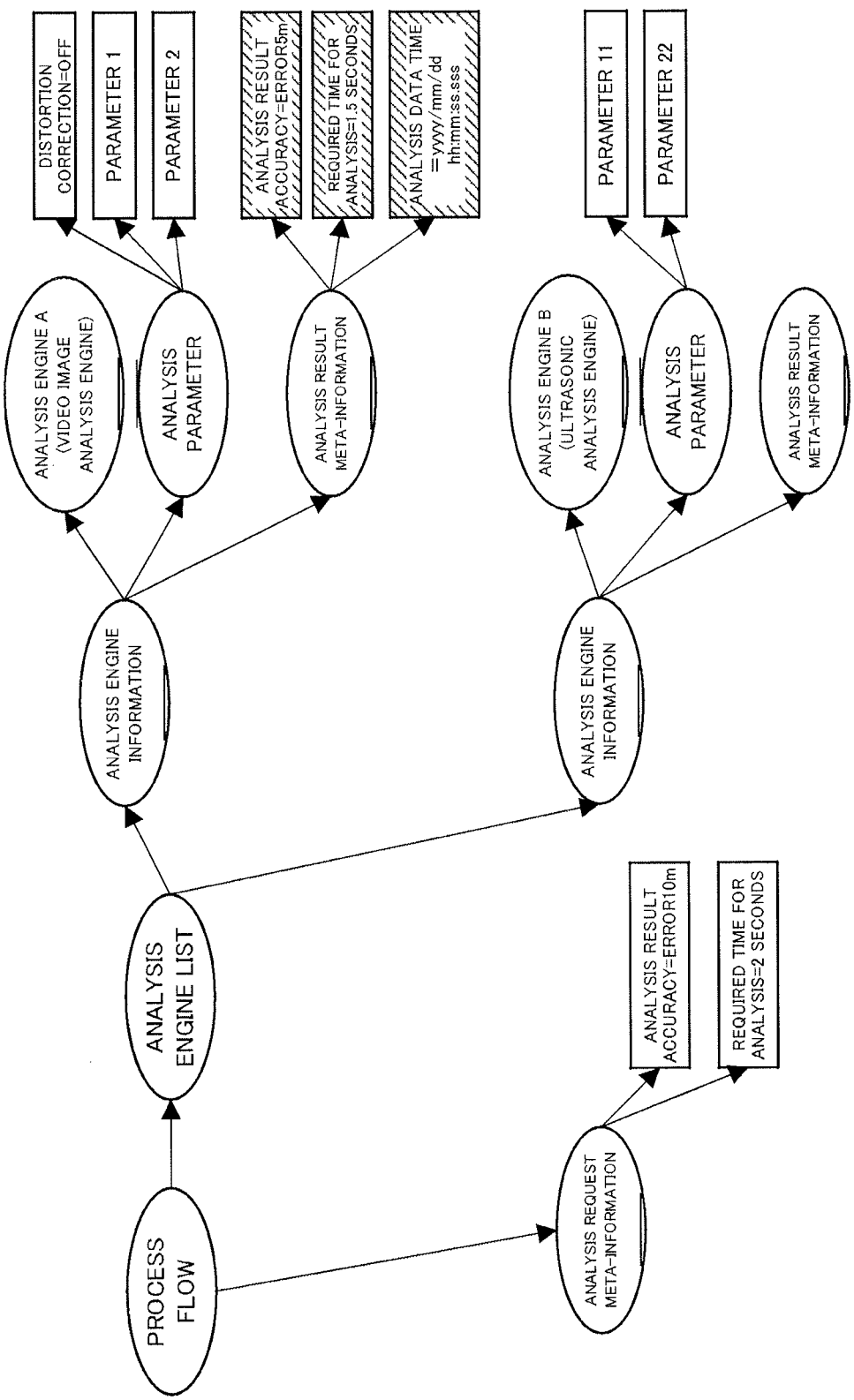
FIG. 7 is a diagram showing state transition of the process flow generated by the analysis engine control device disclosed in FIG. 1.
Figure 8:
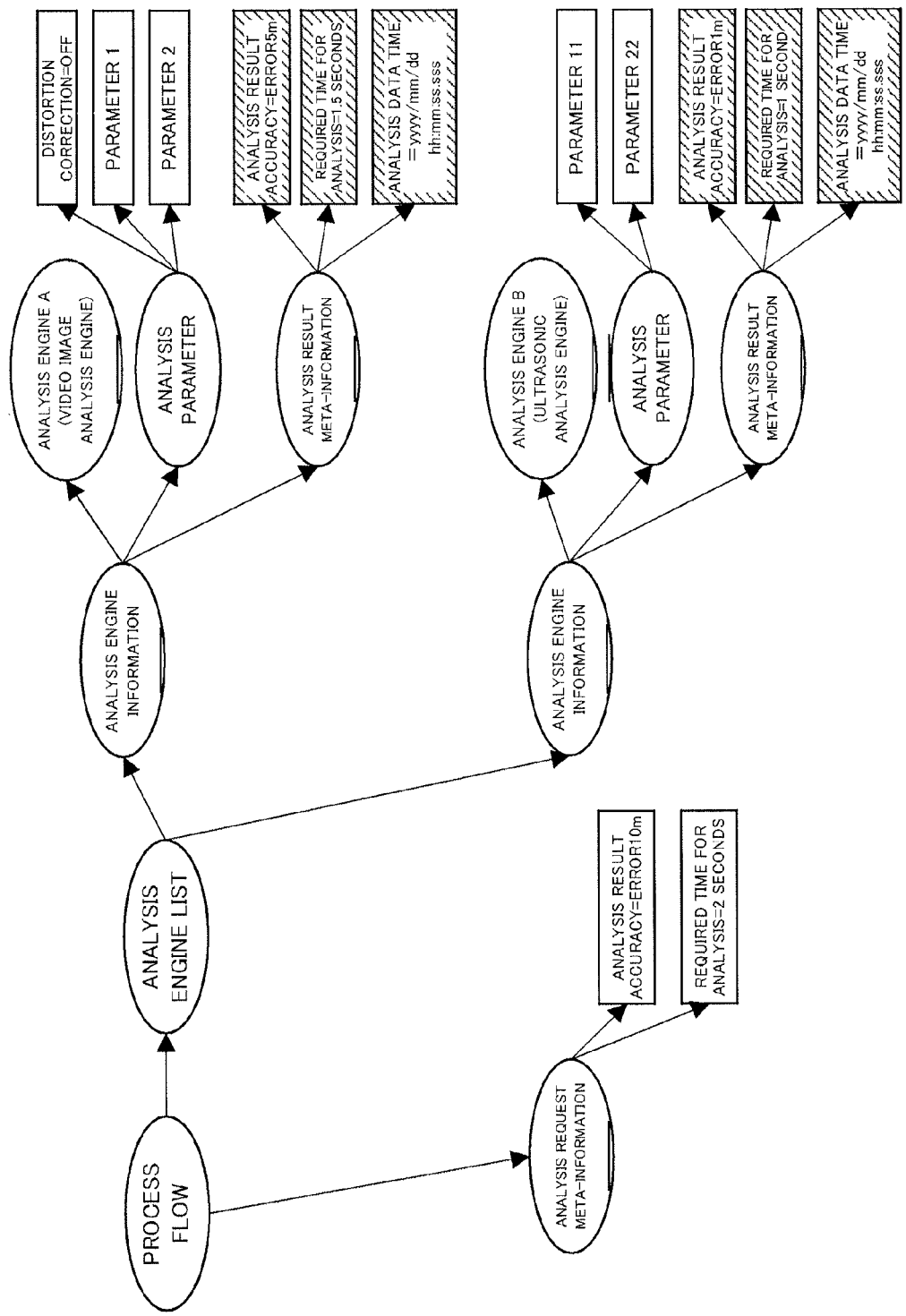
FIG. 8 is a diagram showing state transition of the process flow generated by the analysis engine control device disclosed in FIG. 1.

Subsequently, the analysis engine controlling unit 11 executes an analysis process by using the respective analysis engines as described above based on the generated process flow (step S3). After that, the analysis engine controlling unit 11 receives analysis process results from the respective analysis engines, adds the analysis process results to the process flow as shown by shading in FIG. 7 or 8, and passes to the process flow editing unit 12. FIG. 7 shows an aspect when the result of the analysis process by the analysis engine A of "meta-information 1," which is an intermediate result of the analysis process of the whole process flow, is added to the process flow. Moreover, FIG. 8 shows an aspect when the results of the analysis processes by the analysis engine A of "meta-information 1" and the analysis engine B of "meta-information 3," which are the analysis process results of the whole process flow, are added to the process flow. In this exemplary embodiment, as shown in FIG. 7, the device proceeds to an operation of correcting the process flow when needed as shown below at a time that an intermediate result of the analysis process of the process flow is added. However, the device may proceed to the operation of correcting the process flow shown below after the analysis process results of the whole process flow are added to the process flow as shown in FIG. 8.

Subsequently, the process flow editing unit 12 considers whether the analysis process result added to the process flow as shown in FIG. 7 satisfies "analysis process result conditions" and, when not satisfying (step S4), performs correction of the process flow (step S5). To be specific, correction of the process flow is to, based on the results of the analysis processes by the respective analysis engines, focus on an item which does not satisfy "analysis process result condition" and change an analysis engine, namely, "meta-information ID" so as to be capable of improving the item so that the "analysis process result condition" is satisfied. In this case, the process flow editing unit 12 corrects the process flow by, with reference to the analysis engine meta-information table 14 included in the process flow, changing an analysis engine with a certain "meta-information ID" included in the process flow to an analysis engine with "another meta-information ID" which is of the same "engine type" as "engine type" set for the certain "meta-information ID." Even when an analysis process result satisfies "analysis process result condition," in a case that the value of an item satisfying "analysis process result condition" has a difference of a predetermined value or more, that is, the item extremely satisfies an analysis process result condition, the process flow editing unit 12 may perform change of an analysis engine, namely, meta-information ID by focusing on the item.

For example, in the abovementioned example shown in FIG. 7, the result of the actual analysis process by using "analysis engine A" of "meta-information 1" is "required time for analysis=1.5 seconds." In a case that the result of the analysis process by using "analysis engine B" of "meta-information 3" in the combination is "required time for analysis=1 second" as registered as "analysis process result characteristic" in the analysis engine meta-information table 14, the total required time for analysis does not satisfy "analysis process result condition=within 2 seconds." Therefore, among other meta-information that "object ID detection" of the same "engine type" as "engine type" set for "meta-information 3" is set, an analysis engine of meta-information satisfying the abovementioned "analysis process result condition" is selected. For example, at the time of changing "analysis engine B" of "meta-information 3," it can be found from the analysis engine meta-information table 14 shown in FIG. 2 that "analysis engine C" of "meta-information 4" whose "engine type" is the same "object ID detection" as "meta-information 3" is stored. Because "analysis accuracy=3 m" and "required time=0.5 seconds" are set as "analysis process result characteristics" of "meta-information 4," "analysis process result conditions" are satisfied when "analysis engine C" of "meta-information 4" is used in combination with "analysis engine A" of "meta-information 1." Therefore, the process flow is corrected by changing "analysis engine B" of "meta-information 3" to "analysis engine C" of "meta-information 4" and setting the respective meta-information.

Figure 9:
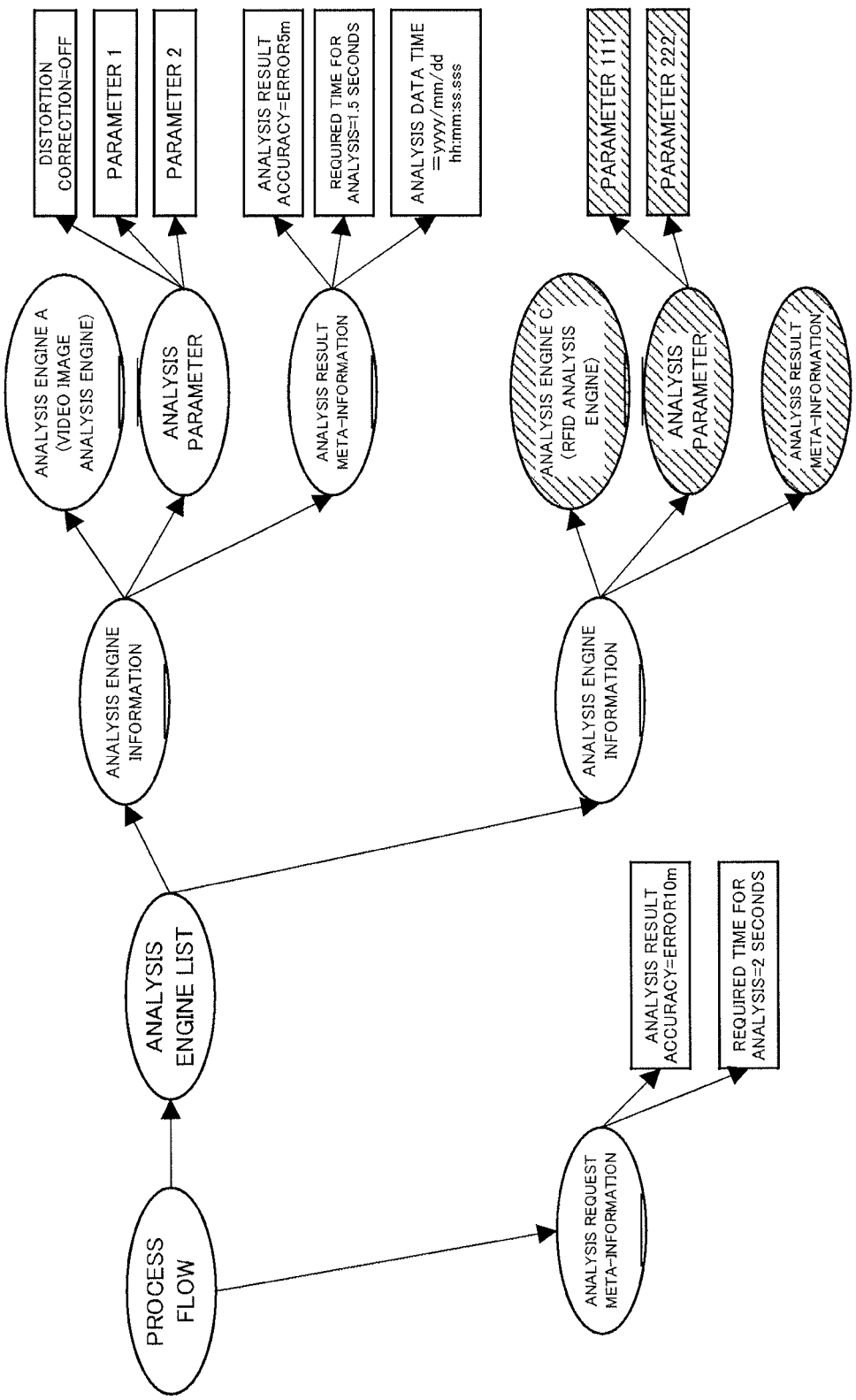
FIG. 9 is a diagram showing state transition of the process flow generated by the analysis engine control device disclosed in FIG. 1.
Figure 10:
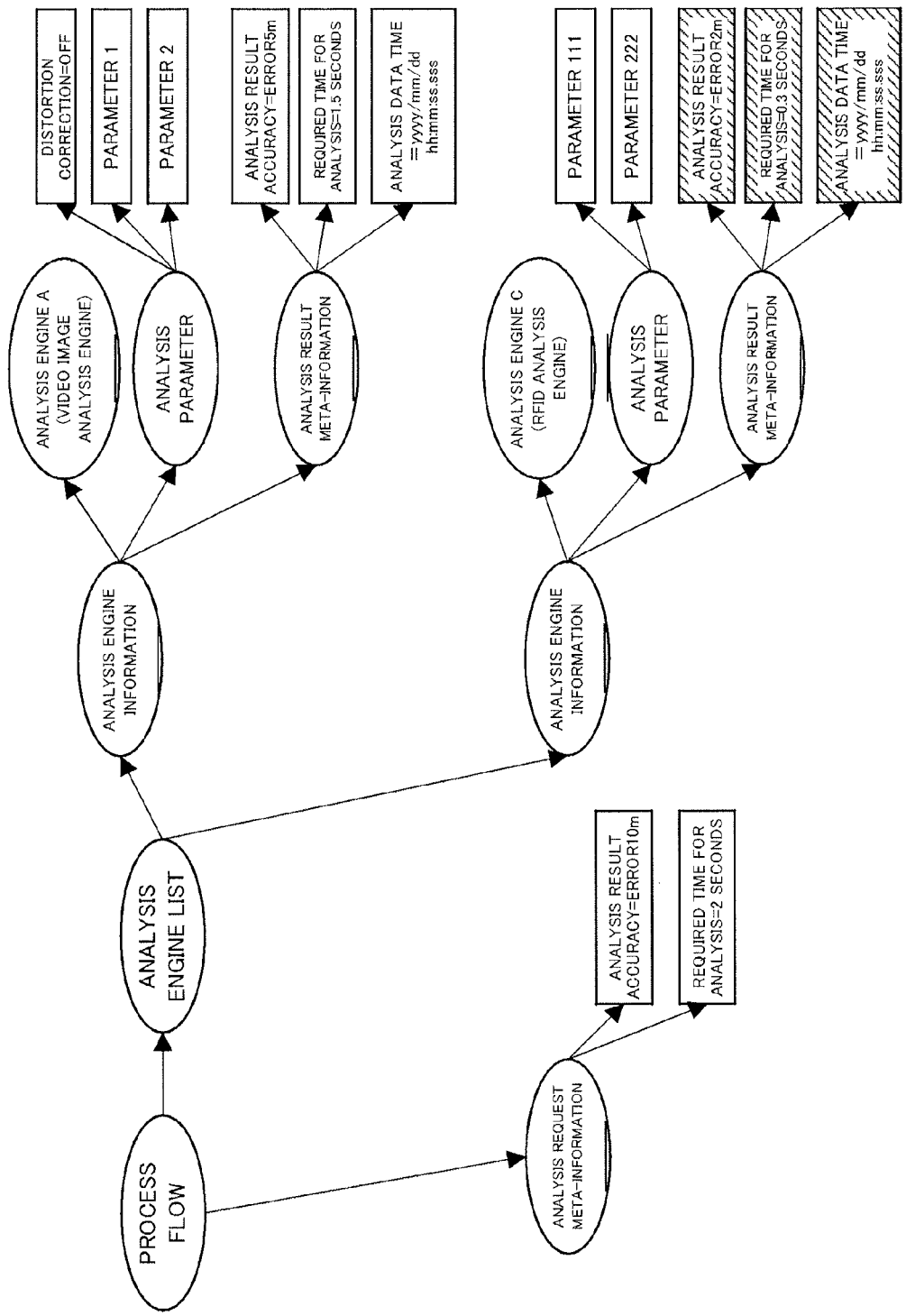
FIG. 10 is a diagram showing state transition of the process flow generated by the analysis engine control device disclosed in FIG. 1.

Then, the analysis engine C (an RFID engine) of "meta-information 4" is set in the process flow that the analysis engine A (a video image analysis engine) of "meta-information 1" is set, as shown by shading in FIG. 9, whereby the process flow is corrected. The process flow editing unit 12 passes the corrected process flow to the analysis engine controlling unit 11.

Subsequently, the analysis engine controlling unit 11 again executes the analysis process by using the respective analysis engines in the same manner as described above based on the corrected process flow (step S3). After that, in the same manner as described above, the analysis engine controlling unit 11 receives analysis process results from the respective analysis engines, adds the analysis process results to the process flow as shown by shading in FIG. 10, and passes to the process flow editing unit 12. In this case, because the analysis process results satisfy "analysis process result conditions" (Yes at step S4), the analysis engine controlling unit 11 ends the process.

Although the above example describes a case of changing an analysis engine to another analysis engine when correcting a process flow, an analysis engine may be changed to the same analysis engine of another meta-information ID for which a different parameter set is set.

Thus, according to the present invention, even when performing analysis by making a plurality of analysis engines work in cooperation, it is possible, in accordance with the result of an analysis process by an analysis engine, to change to another analysis engine or changing an analysis parameter and set an analysis procedure satisfying an analysis process request. Consequently, it is possible to easily obtain a desired analysis process result even if an analysis process is complicated.

<Supplementary Notes>

Figure 11:
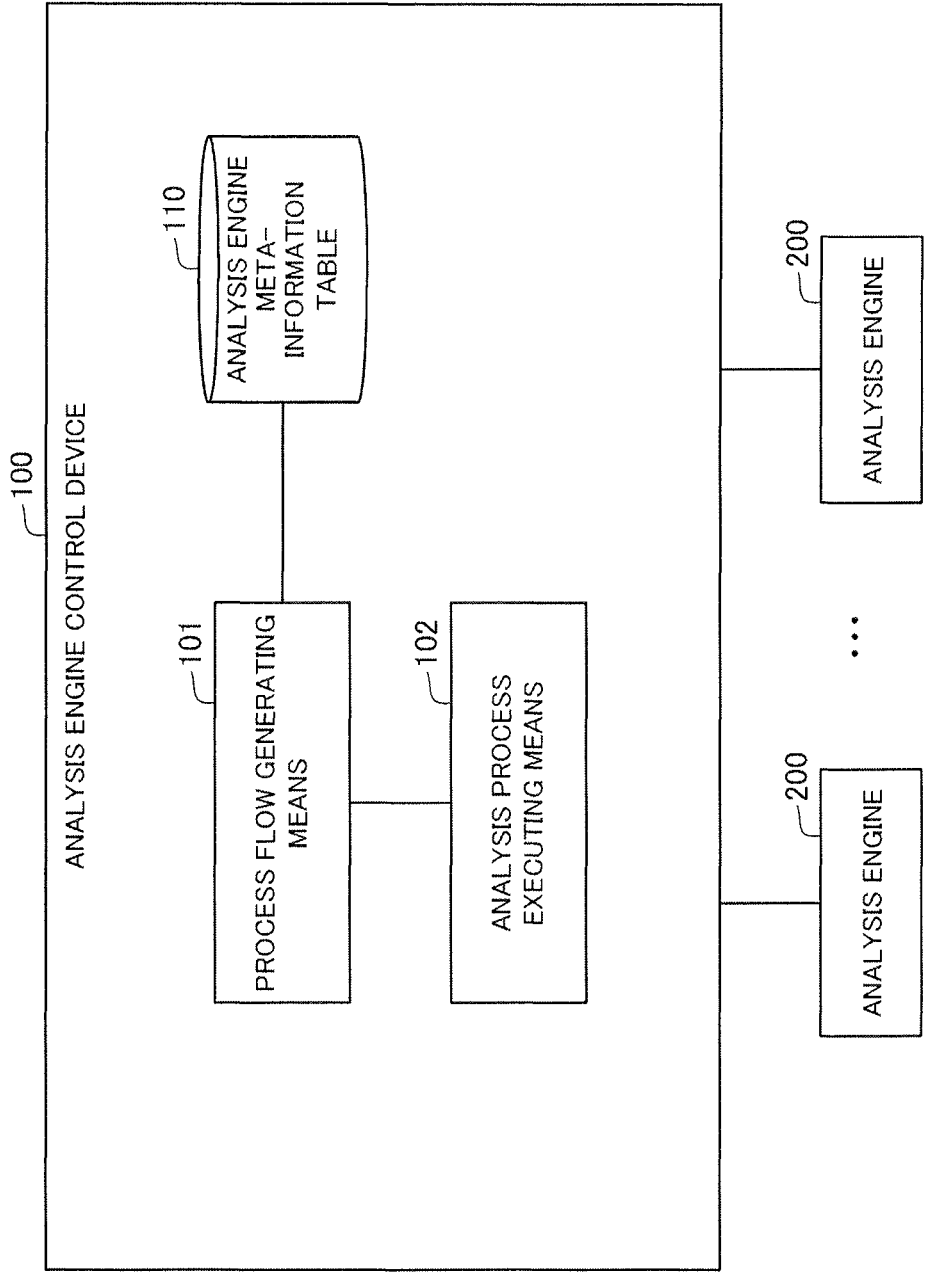
FIG. 11 is a block diagram showing the configuration of an analysis engine control device in Supplementary Note 1 of the present invention.

The whole or part of the exemplary embodiments disclosed above can be described as the following supplementary notes. The outline of the configurations of an analysis engine control device in the present invention will be described below with reference to FIG. 11. However, the present invention is not limited to the following configurations.

(Supplementary Note 1)

An analysis engine control device 100, comprising:

an analysis engine meta-information table 110 storing an analysis process content and an analysis process result characteristic for each analysis engine;

a process flow generating means 101 for, in response to an analysis process request in which an analysis process content and an analysis process result condition are set, selecting a plurality of analysis engines 200 each executing an analysis process which satisfies the analysis process result condition set in the analysis process request and corresponds to the analysis process content based on the analysis engine meta-information table 110, and generating a process flow showing an analysis procedure by the selected analysis engines 200; and an analysis process executing means 102 for executing an analysis process by each of the analysis engines 200 based on the generated process flow, wherein the process flow generating means 101 is configured to, in accordance with a result of an actual analysis process by each of the analysis engines 200 executed by the analysis process executing means 102, correct the process flow so that an analysis process satisfying the analysis process result condition and corresponding to the analysis process content is executed, based on the analysis engine meta-information table 110.

(Supplementary Note 2)

The analysis engine control device according to Supplementary Note 1, wherein the process flow generating means is configured to correct the process flow based on the analysis engine meta-information table in accordance with an intermediate result of an actual analysis process executed by the analysis process executing means based on the process flow, the intermediate result being a result of an actual analysis process by part of the analysis engines included in the process flow.

(Supplementary Note 3)

The analysis engine control device according to Supplementary Note 1 or 2, wherein:

the analysis process content stored by the analysis engine meta-information table is an engine type classified depending on the analysis process content; and the process flow generating means is configured to, based on the analysis engine meta-information table, select the analysis engine of the engine type corresponding to the analysis process content set in the analysis process request and, when correcting the process flow, correct the process flow by changing the analysis engine set in the process flow to the analysis engine of the same engine type as the analysis engine set in the process flow.

(Supplementary Note 4)

The analysis engine control device according to Supplementary Note 3, comprising an analysis engine combination information table storing, for each of the analysis process contents, an engine type combination capable of executing an analysis process corresponding to the analysis process content, wherein the process flow generating means is configured to select an analysis engine combination corresponding to the analysis process content set in the analysis process request, based on the analysis engine combination information table and the analysis engine meta-information table.

(Supplementary Note 5)

The analysis engine control device according to any of Supplementary Notes 1 to 4, wherein:

the analysis process result condition set in the analysis process request is analysis accuracy of the analysis process and a processing time for the analysis process;

the analysis process result characteristic stored by the analysis engine meta-information table is analysis accuracy of the analysis process and a processing time for the analysis process; and the process flow generating means is configured to: select a plurality of analysis engines each executing an analysis process which satisfies analysis accuracy of the analysis process and a processing time for the analysis process of the analysis process result condition set in the analysis process request and corresponds to the analysis process content, based on the analysis engine meta-information table; and when correcting the process flow, correct the process flow based on the analysis engine meta-information table so that the analysis process satisfying the analysis accuracy of the analysis process and the processing time for the analysis process of the analysis process result condition set in the analysis process request and corresponding to the analysis process content is executed, in accordance with a result of an actual analysis process by the analysis engine executed by the analysis process executing means.

(Supplementary Note 6)

The analysis engine control device according to any of Supplementary Notes 1 to 5, wherein:

the analysis engine meta-information table stores a plurality of parameter patterns each of which is set into a predetermined one of the analysis engines at a time of an analysis process by the analysis engine, and also stores the analysis process content and the analysis process result characteristic for each of the parameter patterns; and the process flow generating means is configured to, when generating or correcting the process flow, generate or correct the process flow so that setting the parameter pattern corresponding to the analysis engine selected or corrected so as to execute an analysis process satisfying the analysis process result condition set in the analysis process request and corresponding to the analysis process content is included at a time of an analysis process by the analysis engine, based on the analysis engine meta-information table.

(Supplementary Note 7)

A computer program comprising instructions for causing an information processing device, which includes an analysis engine meta-information table storing an analysis process content and an analysis process result characteristic for each analysis engine, to realize;

a process flow generating means for, in response to an analysis process request in which an analysis process content and an analysis process result condition are set, selecting a plurality of analysis engines each executing an analysis process which satisfies the analysis process result condition set in the analysis process request and corresponds to the analysis process content based on the analysis engine meta-information table, and generating a process flow showing an analysis procedure by the selected analysis engines; and an analysis process executing means for executing an analysis process by each of the analysis engines based on the generated process flow, the computer program comprising instructions for causing the process flow generating means to perform operations which include, in accordance with a result of an actual analysis process by each of the analysis engines executed by the analysis process executing means, correcting the process flow so that an analysis process satisfying the analysis process result condition and corresponding to the analysis process content is executed, based on the analysis engine meta-information table.

(Supplementary Note 8)

The computer program according to Supplementary Note 7, comprising instructions for causing the process flow generating means to perform operations which include correcting the process flow based on the analysis engine meta-information table in accordance with an intermediate result of an actual analysis process executed by the analysis process executing means based on the process flow, the intermediate result being a result of an actual analysis process by part of the analysis engines included in the process flow.

(Supplementary Note 9)

The computer program according to Supplementary Note 7 or 8, wherein:

the analysis process result condition set in the analysis process request is analysis accuracy of the analysis process and a processing time for the analysis process; and the analysis process result characteristic stored by the analysis engine meta-information table is analysis accuracy of the analysis process and a processing time for the analysis process, the computer program comprising instructions for causing the process flow generating means to perform operations which include: selecting a plurality of analysis engines each executing an analysis process which satisfies analysis accuracy of the analysis process and a processing time for the analysis process of the analysis process result condition set in the analysis process request and corresponds to the analysis process content, based on the analysis engine meta-information table; and when correcting the process flow, correcting the process flow based on the analysis engine meta-information table so that the analysis process satisfying the analysis accuracy of the analysis process and the processing time for the analysis process of the analysis process result condition set in the analysis process request and corresponding to the analysis process content is executed, in accordance with a result of an actual analysis process by the analysis engine executed by the analysis process executing means.

(Supplementary Note 10)

The computer program according to any of Supplementary Notes 7 to 9, wherein the analysis engine meta-information table stores a plurality of parameter patterns each of which is set into a predetermined one of the analysis engines at a time of an analysis process by the analysis engine, and also stores the analysis process content and the analysis process result characteristic for each of the parameter patterns, the computer program comprising instructions for causing the process flow generating means to perform operations which include, when generating or correcting the process flow, generating or correcting the process flow so that setting the parameter pattern corresponding to the analysis engine selected or corrected so as to execute an analysis process satisfying the analysis process result condition set in the analysis process request and corresponding to the analysis process content is included at a time of an analysis process by the analysis engine, based on the analysis engine meta-information table.

(Supplementary Note 11)

An analysis engine control method comprising, by an information processing device including an analysis engine meta-information table storing an analysis process content and an analysis process result characteristic for each analysis engine:

in response to an analysis process request in which an analysis process content and an analysis process result condition are set, selecting a plurality of analysis engines each executing an analysis process which satisfies the analysis process result condition set in the analysis process request and corresponds to the analysis process content based on the analysis engine meta-information table, and generating a process flow showing an analysis procedure by the selected analysis engines;

executing an analysis process by each of the analysis engines based on the generated process flow;

in accordance with a result of an actual analysis process by each of the analysis engines executed, correcting the process flow so that an analysis process satisfying the analysis process result condition and corresponding to the analysis process content is executed, based on the analysis engine meta-information table; and executing the analysis process by the analysis engine based on the corrected process flow.

(Supplementary Note 12)

The analysis engine control method according to Supplementary Note 11, comprising, at a time of correction of the process flow, correcting the process flow based on the analysis engine meta-information table in accordance with an intermediate result of an actual analysis process executed based on the process flow, the intermediate result being a result of an actual analysis process by part of the analysis engines included in the process flow.

(Supplementary Note 13)

The analysis engine control method according to Supplementary Note 11 or 12, wherein:

the analysis process result condition set in the analysis process request is analysis accuracy of the analysis process and a processing time for the analysis process;

the analysis process result characteristic stored by the analysis engine meta-information table is analysis accuracy of the analysis process and a processing time for the analysis process, the analysis engine control method comprising:

at a time of generation of the process flow, selecting a plurality of analysis engines each executing an analysis process which satisfies analysis accuracy of the analysis process and a processing time for the analysis process of the analysis process result condition set in the analysis process request and corresponds to the analysis process content, based on the analysis engine meta-information table; and at a time of correction of the process flow, correcting the process flow based on the analysis engine meta-information table so that the analysis process satisfying the analysis accuracy of the analysis process and the processing time for the analysis process of the analysis process result condition set in the analysis process request and corresponding to the analysis process content is executed, in accordance with a result of an actual analysis process by the analysis engine executed.

(Supplementary Note 14)

The analysis engine control method according to any of Supplementary Notes 11 to 13, wherein:

the analysis engine meta-information table stores a plurality of parameter patterns each of which is set into a predetermined one of the analysis engines at a time of an analysis process by the analysis engine, and also stores the analysis process content and the analysis process result characteristic for each of the parameter patterns, the analysis engine control method comprising, at a time of generation or correction of the process flow, generating or correcting the process flow so that setting the parameter pattern corresponding to the analysis engine selected or corrected so as to execute an analysis process satisfying the analysis process result condition set in the analysis process request and corresponding to the analysis process content is included at a time of an analysis process by the analysis engine, based on the analysis engine meta-information table.

(Supplementary Note 15)

The analysis engine control method according to any of Supplementary Notes 11 to 14, comprising executing an analysis process by the analysis engine based on the corrected process flow, and further, in accordance with a result of an actual analysis process by the analysis engine executed, correcting the process flow based on the analysis engine meta-information table so as to execute an analysis process satisfying the analysis process result condition and corresponding to the analysis process content.

The program in each of the exemplary embodiments is stored in the storage device, or recorded in a computer-readable recording medium. For example, the recording medium is a portable medium such as a flexible disk, an optical disk, a magneto-optical disk and a semiconductor memory.

Although the present invention has been described above with reference to the exemplary embodiments, the present invention is not limited to the above exemplary embodiments. The configurations and details of the present invention can be modified within the scope of the present invention in various manners that can be understood by those skilled in the art.

The present invention is based upon and claims the benefit of priority from Japanese patent application No. 2011-025805, filed on Feb. 9, 2011, the disclosure of which is incorporated herein in its entirety by reference.

DESCRIPTION OF REFERENCE NUMERALS 1 analysis engine control device
2 application
11 analysis engine controlling unit
12 process flow editing unit
13 analysis process content judging unit
14 analysis engine meta-information table
15 analysis engine combination information table
A, B, C analysis engine
100 analysis engine control device
101 process flow generating means
102 analysis process executing means
110 analysis engine meta-information table
200 analysis engine

The invention claimed is:

1. An analysis engine control device, comprising:

a hardware processor;

an analysis engine meta-information table storing an analysis process content and an analysis process result characteristic for each analysis engine;

a process flow generating unit, implemented on the processor, configured to, in response to an analysis process request in which the analysis process content and an analysis process result condition are set, select a plurality of analysis engines each executing an analysis process which satisfies the analysis process result condition set in the analysis process request and corresponds to the analysis process content based on the analysis engine meta-information table, and generate a process flow indicating an analysis procedure to be executed by the selected analysis engines;

an analysis process executing unit, implemented on the processor, configured to execute an analysis process by each of the analysis engines based on the generated process flow; and an analysis engine combination information table storing, for each of a plurality of analysis process contents including the analysis process content, an engine type combination configured to execute the analysis process corresponding to the analysis process content, wherein the process flow generating unit is further configured to, in accordance with a result of the analysis process executed by each of the analysis engines executed by the analysis process executing unit, correct the process flow so that another analysis process, satisfying the analysis process result condition and corresponding to the analysis process content, is executed, based on the analysis engine meta-information table, wherein the analysis process content stored by the analysis engine meta-information table is an engine type classified depending on the analysis process content, wherein the process flow generating unit is further configured to, based on the analysis engine meta-information table, select one of the analysis engines of the engine type corresponding to the analysis process content set in the analysis process request and, when correcting the process flow, correct the process flow by changing the one of the analysis engines, set in the process flow, to another analysis engine of a same engine type as the analysis engine set in the process flow, and wherein the process flow generating unit is further configured to select an analysis engine combination corresponding to the analysis process content set in the analysis process request, based on the analysis engine combination information table and the analysis engine meta-information table.

2. The analysis engine control device according to claim 1, wherein the process flow generating unit is further configured to correct the process flow based on the analysis engine meta-information table in accordance with an intermediate result of an actual analysis process executed by the analysis process executing unit based on the process flow, the intermediate result being a result of the executed analysis process by part of the selected analysis engines included in the process flow.

3. The analysis engine control device according to claim 1, wherein:
the analysis process result condition set in the analysis process request is an analysis accuracy of the analysis process and a processing time for the analysis process;
the analysis process result characteristic stored by the analysis engine meta-information table is the analysis accuracy of the analysis process and the processing time for the analysis process; and
the process flow generating unit is further configured to:
select the plurality of analysis engines each executing the analysis process which satisfies the analysis accuracy of the analysis process and the processing time for the analysis process of the analysis process result condition set in the analysis process request and corresponds to the analysis process content, based on the analysis engine meta-information table, and
when correcting the process flow, correct the process flow based on the analysis engine meta-information table so that the another analysis process, satisfying the analysis accuracy of the analysis process and the processing time for the analysis process of the analysis process result condition set in the analysis process request and corresponding to the analysis process content, is executed, in accordance with the result of the analysis process executed by the one of the analysis engines executed by the analysis process executing unit.

4. The analysis engine control device according to claim 1, wherein:
the analysis engine meta-information table further stores a plurality of parameter patterns each of which is set into a predetermined one of the analysis engines at a time of an analysis process by the analysis engine, and also stores the analysis process content and the analysis process result characteristic for each of the parameter patterns; and
the process flow generating unit is further configured to, when generating or correcting the process flow, generate or correct the process flow so that setting the parameter pattern corresponding to the one of the analysis engines is selected or corrected so as to execute the another analysis process satisfying the analysis process result condition set in the analysis process request and corresponding to the analysis process content that is included at a time of an analysis process by the analysis engine, based on the analysis engine meta-information table.

5. A non-transitory computer-readable medium storing a computer program comprising instructions configured to cause an information processing device, which comprises an analysis engine meta-information table storing an analysis process content and an analysis process result characteristic for each analysis engine, to realize:
a process flow generating unit, implemented on a processor of the information processing device, configured to, in response to an analysis process request in which an analysis process content and an analysis process result condition are set, select a plurality of analysis engines each executing an analysis process which satisfies the analysis process result condition set in the analysis process request and corresponds to the analysis process content based on the analysis engine meta-information table, and generating a process flow indicating an analysis procedure to be executed by the selected analysis engines;
an analysis process executing unit, implemented on the processor, configured to execute an analysis process by each of the analysis engines based on the generated process flow; and
an analysis engine combination information table storing, for each of a plurality of analysis process contents including the analysis process content, an engine type combination configured to execute the analysis process corresponding to the analysis process content, wherein
the computer program comprising the instructions is further configured to cause the process flow generating unit to perform operations which comprise, in accordance with a result of the executed analysis process by each of the analysis engines executed by the analysis process executing unit, correcting the process flow so that another analysis process, satisfying the analysis process result condition and corresponding to the analysis process content, is executed, based on the analysis engine meta-information table,
the analysis process content stored by the analysis engine meta-information table is an engine type classified depending on the analysis process content, and
the computer program comprising the instructions is further configured to cause the process flow generating unit to, based on the analysis engine meta-information table, select one of the analysis engines of the engine type corresponding to the analysis process content set in the analysis process request and, when correcting the process flow, correct the process flow by changing the one of the analysis engines, set in the process flow, to another analysis engine of a same engine type as the analysis engine set in the process flow,
wherein the process flow generating unit is further configured to select an analysis engine combination corresponding to the analysis process content set in the analysis process request, based on the analysis engine combination information table and the analysis engine meta-information table.

6. The non-transitory computer-readable medium storing the computer program according to claim 5, comprising the instructions further configured to cause the process flow generating unit to perform the operations which further comprise correcting the process flow based on the analysis engine meta-information table in accordance with an intermediate result of an actual analysis process executed by the analysis process executing unit based on the process flow, the intermediate result being a result of the analysis process by part of the selected analysis engines included in the process flow.

7. The non-transitory computer-readable medium storing the computer program according to claim 5, wherein:
the analysis process result condition set in the analysis process request is an analysis accuracy of the analysis process and a processing time for the analysis process,
the analysis process result characteristic stored by the analysis engine meta-information table is the analysis accuracy of the analysis process and the processing time for the analysis process, and
the computer program comprising the instructions is further configured to cause the process flow generating unit to perform the operations which further comprise:
selecting the plurality of analysis engines each executing the analysis process which satisfies the analysis accuracy of the analysis process and the processing time for the analysis process of the analysis process result condition set in the analysis process request and corresponding to the analysis process content, based on the analysis engine meta-information table, and when correcting the process flow, correcting the process flow based on the analysis engine meta-information table so that the analysis process satisfying the analysis accuracy of the analysis process and the processing time for the analysis process of the analysis process result condition set in the analysis process request and corresponding to the analysis process content is executed, in accordance with the result of the actual analysis process by the analysis engine executed by the analysis process executing unit.

8. The non-transitory computer-readable medium storing the computer program according to claim 5, wherein the analysis engine meta-information table further stores a plurality of parameter patterns each of which is set into a predetermined one of the analysis engines at a time of an analysis process by the analysis engine, and also stores the analysis process content and the analysis process result characteristic for each of the parameter patterns, and the computer program comprising the instructions further configured to cause the process flow generating unit to perform operations which comprise, when generating or correcting the process flow, generating or correcting the process flow so that setting the parameter pattern corresponding to the one of the analysis engines is selected or corrected so as to execute the another analysis process satisfying the analysis process result condition set in the analysis process request and corresponding to the analysis process content that is included at a time of an analysis process by the analysis engine, based on the analysis engine meta-information table.

9. An analysis engine control method comprising, by an information processing device comprising an analysis engine meta-information table storing an analysis process content and an analysis process result characteristic for each analysis engine:

in response to an analysis process request in which an analysis process content and an analysis process result condition are set, selecting a plurality of analysis engines each executing an analysis process which satisfies the analysis process result condition set in the analysis process request and corresponds to the analysis process content based on the analysis engine meta-information table, generating a process flow indicating an analysis procedure to be executed by the selected analysis engines;

executing an analysis process by each of the analysis engines based on the generated process flow; and in accordance with a result of the analysis process executed by each of the analysis engines, correcting the process flow so that another analysis process satisfying the analysis process result condition and corresponding to the analysis process content is executed, based on the analysis engine meta-information table;

executing the another analysis process by one of the analysis engines based on the corrected process flow;

storing, in an analysis engine combination information table storing and for each of a plurality of analysis process contents including the analysis process content, an engine type combination configured to execute the analysis process corresponding to the analysis process content, wherein the analysis process content stored by the analysis engine meta-information table is an engine type classified depending on the analysis process content, and the computer program comprising the instructions is further configured to:

cause the process flow generating unit to, based on the analysis engine meta-information table, select one of the analysis engines of the engine type corresponding to the analysis process content set in the analysis process request and, when correcting the process flow, correct the process flow by changing the one of the analysis engines, set in the process flow, to another analysis engine of a same engine type as the analysis engine set in the process flow; and to select an analysis engine combination corresponding to the analysis process content set in the analysis process request, based on the analysis engine combination information table and the analysis engine meta-information table.

10. The analysis engine control method according to claim 9, comprising, at a time of correction of the process flow, correcting the process flow based on the analysis engine meta-information table in accordance with an intermediate result of an actual analysis process executed based on the process flow, the intermediate result being a result of the actual analysis process by part of the selected analysis engines included in the process flow.

11. The analysis engine control method according to claim 9, wherein:

the analysis process result condition set in the analysis process request is an analysis accuracy of the analysis process and a processing time for the analysis process;

the analysis process result characteristic stored by the analysis engine meta-information table is the analysis accuracy of the analysis process and the processing time for the analysis process, the analysis engine control method further comprises:

at a time of generation of the process flow, selecting the plurality of analysis engines each executing the analysis process which satisfies the analysis accuracy of the analysis process and the processing time for the analysis process of the analysis process result condition set in the analysis process request and corresponding to the analysis process content, based on the analysis engine meta-information table; and at a time of correction of the process flow, correcting the process flow based on the analysis engine meta-information table so that the another analysis process, satisfying the analysis accuracy of the analysis process and the processing time for the analysis process of the analysis process result condition set in the analysis process request and corresponding to the analysis process content, is executed, in accordance with the result of the analysis process executed by the one of the analysis engines.

12. The analysis engine control method according to claim 9, wherein:

the analysis engine meta-information table further stores a plurality of parameter patterns each of which is set into a predetermined one of the analysis engines at a time of an analysis process by the analysis engine, and also stores the analysis process content and the analysis process result characteristic for each of the parameter patterns, the analysis engine control method further comprises, at a time of generation or correction of the process flow, generating or correcting the process flow so that setting the parameter pattern corresponding to the one of the analysis engines selected or corrected so as to execute the another analysis process, satisfying the analysis process result condition set in the analysis process request and corresponding to the analysis process content, is included at a time of an analysis process by the one of the analysis engines, based on the analysis engine meta-information table.

13. The analysis engine control method according to claim 9, further comprising executing the another analysis process by the one of the analysis engines based on the corrected process flow, and further, in accordance with the result of the analysis process executed by the analysis engines, and correcting the process flow based on the analysis engine meta-information table so as to execute the another analysis process satisfying the analysis process result condition and corresponding to the analysis process content.

* * * * *